Patented Aug. 19, 1924.

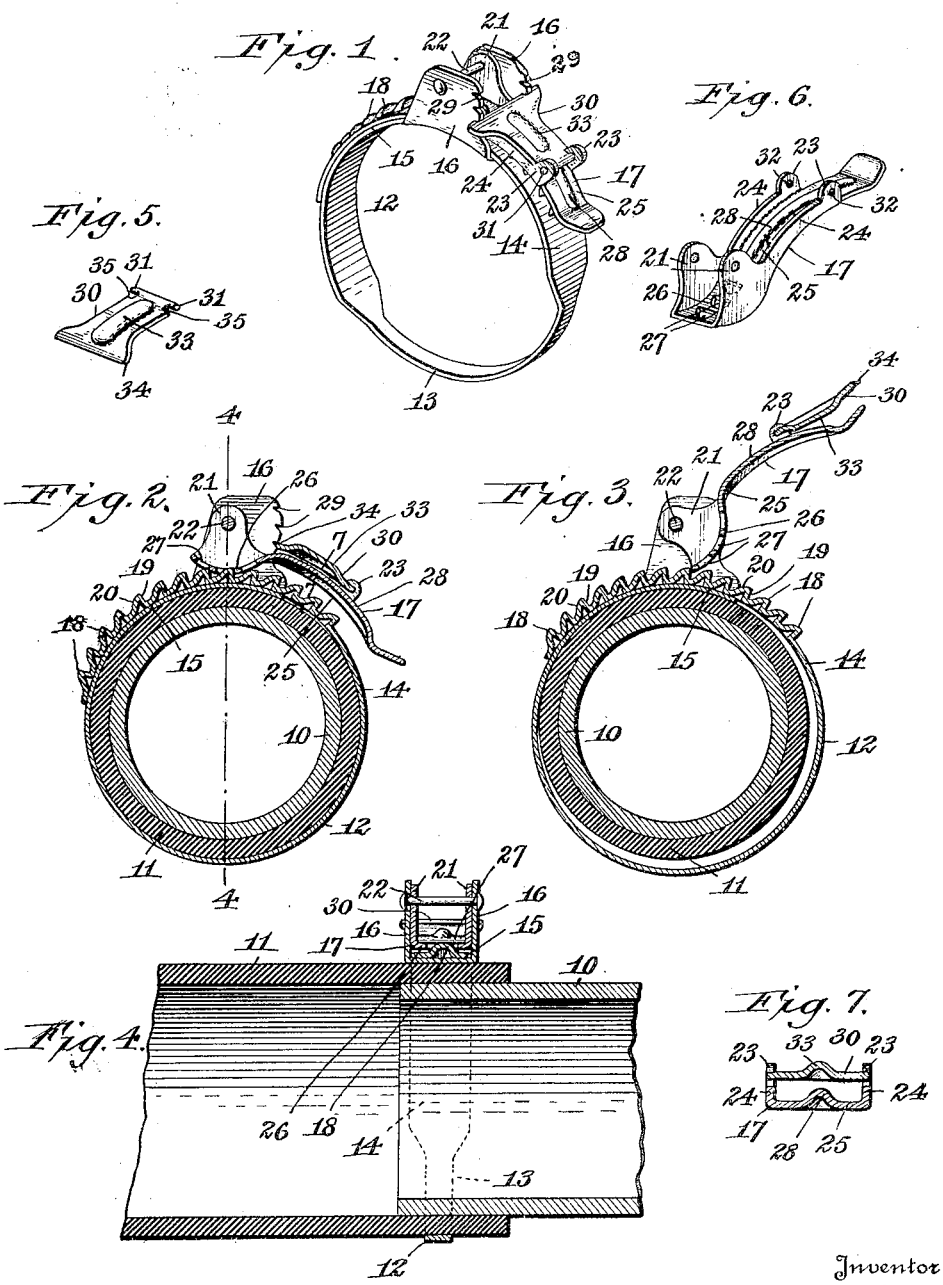

1,505,895

UNITED STATES PATENT OFFICE.

KARL F. W. KEMPF, OF BUFFALO, NEW YORK.

HOSE CLAMP.

Application filed August 24, 1921. Serial No. 494,916.

*To all whom it may concern:*

Be it known that I, KARL F. W. KEMPF, a citizen of the Republic of Germany, residing at Buffalo, in the county of Erie and State of New York, have invented certain new and useful Improvements in Hose Clamps, of which the following is a specification.

My invention relates to an improved hose-clamp, and it has for its primary object the provision of an improved clamp which may be easily and quickly applied to or be removed from a hose and in which considerable leverage is secured to securely clamp the hose to a nipple or other object.

A further object is the provision of a device of this kind of simple construction and one that can be readily adjusted for use on hose of different diameters.

A still further object of my invention is to provide a hose clamp which when rusted, due to moisture, or to water dripping thereon, will not detract from its effectiveness.

With the above and other objects in view, the invention consists in the novel features of construction and in the arrangement and combination of parts to be hereinafter described and more particularly pointed out in the subjoined claims.

In the drawings:—

Fig. 1 is a perspective view of my improved hose clamp showing the same in clamping condition.

Fig. 2 is a transverse section through my improved hose clamp as applied to a hose fitted onto a nipple or similar object, the same being shown tightened on the hose and retained in tightened position.

Fig. 3 is a like section, showing the actuating element raised and the clamping ring or loop loosened.

Fig. 4 is a section taken on line 4—4, Fig. 2.

Fig. 5 is a detached perspective view of the retainer catch.

Fig. 6 is a detached perspective view of the actuating or clamping lever.

Fig. 7 is a cross section on an enlarged scale, taken on line 7—7, Fig. 2.

The reference numeral 10 designates a nipple, pipe, or other similar object, which may be employed to connect two lengths of hose together, or may be an object projecting from some device or apparatus, such as the radiator of an automobile or the water jacket of an explosive engine; and 11 designates a hose placed over the nipple and, adapted to be fastened thereto in a manner, to render it water-tight, or steam tight if desired.

12 designates my improved hose-clamp considered as a whole. This clamp comprises a flexible strip of metal, preferably of a springy nature, which is narrowed between its ends, as at 13, so that it will more readily conform itself to hose of different diameters and more effectively grip the hose and clamp the same to a nipple, pipe or similar object. The metal from which the clamp is constructed is curved to form an open ring or band 14 having one end portion thereof overlapping the other, as at 15, the overlapped end portion having a pair of outstanding lugs 16 at its extremity to which an actuating or clamping lever 17 is pivotally secured. The overlapping portion of the band has teeth 18 stamped outwardly therefrom, said teeth being formed by bulging the metal outwardly along a central region extending from the end of the overlapping portion inwardly a considerable distance, the teeth so formed having abrupt faces 19 and inclined faces 20. By extending the teeth along a considerable distance, a wide range of adjustment is possible so that the clamp can be used on hose of different diameters. The actuating or clamping lever 17 is stamped from sheet metal and at one end thereof has a pair of lugs 21 which fit between the pair of lugs 16 of the band 14 and lie against the inner face of said lugs, a pivot pin 22 being passed through the two pairs of lugs and being headed or otherwise secured to the lugs 16 so as to retain the actuating or clamping lever between said last-mentioned lugs. Said lever 17 is also provided with a pair of small lugs 23 a distance from the lugs 21 and it has along its edges between the lugs 21 and 23, flanges 24 to stiffen the body portion 25 thereof, which is curved at its inner end, as at 26, said curved portion 26 having the pivot pin 22 as its center. The body portion 25 of the actuating or clamping lever is provided with a plurality of openings 27 in its curved portion 26, and it has an outstanding bead 28 extending from said curved portion to a point near its outer end; thus the lever 17, although formed of sheet metal, is stiffened by the flanges 24 and the bead 28, which render it very rigid and capable of receiving considerable pressure to tighten the band around the hose, without bending or otherwise distorting said lever.

In Fig. 3, the actuating or clamping lever is shown raised, with the inner end thereof in contact with one of the series of teeth 18 on the band. Now, upon swinging the free end of said lever downwardly against the band, the teeth 18 on the band will be caused to enter the openings 27 in the curved portion of said lever, thus tightening the band around the hose, and as the pivot 22 of said lever is spaced a considerable distance from the band so tightened, that portion of the handle extending outwardly from the curved portion 26 will be positioned beyond the dead center, thus automatically retaining said lever in position. However, as a clamping fit may be secured before the actuating lever is swung beyond the dead center, I have provided corresponding edges of the lugs 16 with teeth 29 and have pivotally secured between the lugs 23 of the actuating or clamping lever a retaining lever 30. Said lever is stamped from sheet metal and has prongs 31 formed at one end thereof, which are entered in openings 32 of the lugs 23 on said actuating or clamping lever and serve as pivots. The retainer lever 30 is provided with a longitudinal rib 33 so as to prevent bending of the same under strain, and the free end thereof, which may be beveled, as shown at 34, is adapted to engage the teeth 29 formed on the lugs 16 of the band 14, and thus prevent outward swinging movement of the actuating lever 17. In order to relieve the prongs or pivots 31 of the retaining lever from strains, I have notched said lever at opposite edges, to form shoulders 35, which bear against the lugs 23, as clearly shown in Fig. 1. Decided advantages are secured by the use of the retainer lever 30, even though the actuating or clamping lever is swung beyond the dead center, as it guards against outward movement of the actuating or clamping lever in the event of the free end thereof being accidentally struck with an upward thrust. Moreover, when the retainer lever is engaged with the first or second pair of the series of teeth formed in the lugs 16 and it is found that the hose has become set or unduly compressed so as to slightly loosen the band, it is simply necessary to depress said actuating or clamping lever, whereupon the free end of the retainer lever will engage the next pair of teeth on the lugs 16.

It might here be stated that the edge of each of the lugs 16 having the teeth 29 formed therein describes an arc of a circle having the pivot 22 as its center, as it is believed that greatest efficiency is secured by retaining the same relation of parts under all conditions.

Having thus described my invention, what I claim is:—

1. A hose clamp comprising an open band adapted to encircle a hose and having opposite ends in overlapping relation, a pair of lugs formed on said band at the extremity of the overlapped end thereof, a rotatable element mounted between said lugs and adapted to engage the overlapping end of said band to tighten said band around the hose, and means carried by said rotatable element adapted to engage said lugs for retaining said rotatable element in tightened position.

2. A hose clamp comprising an open band having its ends overlapped and the overlapping end provided with teeth formed by pressing the metal outwardly from which the band is formed to provide an abrupt and an inclined face for each tooth, and a rotatable actuating element having a series of openings therein adapted to receive the teeth of said band to tighten the band around the hose.

3. A hose clamp comprising an open band having its ends overlapped and having a pair of spaced lugs extending outwardly from the overlapped portion thereof at opposite sides of the overlapping portion, said overlapping portion having teeth formed by stamping the metal of the band outwardly, and an actuating element pivoted between said lugs and having openings therein adapted to engage said teeth to draw the band tightly around the hose.

4. A hose clamp comprising an open band constructed of thin spring metal and having one end thereof overlapping the other, the overlapping end portion being provided with a longitudinal series of teeth stamped from the metal forming said band and the overlapped end portion having a pair of spaced lugs extending outwardly at opposite sides of said overlapping portion, an actuating lever pivotally secured between said lugs and having a curved portion provided with a longitudinal series of openings adapted to mesh with said teeth, and means on said actuating lever engaging said lugs for retaining said lever in clamping position.

5. A hose clamp comprising an open band formed of thin spring metal and having a pair of spaced lugs extending outwardly from opposite edges at one extremity thereof, said band having its ends overlapping but being capable of being separated and having the overlapping end portion provided with a series of longitudinal teeth, an actuating lever formed of sheet metal provided with a pair of spaced lugs, a curved portion connecting said lugs and adapted for co-action with the overlapping end portion of said band and an arm extending outwardly from said curved portion, the lugs of said actuating lever being positioned between said first-mentioned lugs and pivoted thereto, said first-mentioned lugs having teeth at corresponding edges, and a retainer element pivotally secured to the arm of said actuating lever and adapted to engage said teeth with its free end.

6. A hose clamp comprising an open band formed of a strip of thin metal having opposite ends overlapped and having a pair of lugs at one end and a longitudinal series of teeth stamped therein at its other end, an actuating lever formed of sheet metal stamped to provide a curved portion having openings, a pair of lugs at opposite sides of said curved portion and adapted to fit between the lugs of said band, a pivot pin connecting both pairs of lugs, and a retainer lever pivotally connected to said actuating lever and adapted to engage said first-mentioned pair of lugs with its free end.

7. A hose clamp comprising an open band formed of a strip of thin metal and having opposite ends overlapped, the overlapped end portion having a pair of lugs at its extremity and the overlapping end portion having a longitudinal series of teeth stamped therefrom, a pivot pin extending through said lugs, an actuating lever having a curved portion provided with a series of openings adapted to mesh with the teeth of said overlapping end portion and being secured to said pivot pin, said curved portion forming a segment having said pivot pin as its axis, said actuating lever having an arm extending outwardly therefrom and said arm having a pair of lugs thereon, and a retainer lever pivotally secured to said last-mentioned pair of lugs and adapted to engage said first-mentioned pair of lugs to retain said actuating lever in clamping position.

8. A hose clamp comprising an open band formed of a strip of thin metal having opposite ends overlapped, the overlapped end portion having a pair of outstanding lugs at its extremity and the overlapping end portion having teeth stamped therefrom, a pivot pin extending through said lugs, said lugs having corresponding edges describing like segments having said pivot pin as their center and each being provided with a series of teeth, an actuating lever pivotally connected between said lugs and having a series of openings therein adapted to mesh with said first-mentioned teeth, and a retainer lever pivotally connected to said actuating lever at a point distant from said pivot pin and adapted to have its free end engage corresponding teeth of said lugs.

9. A hose clamp comprising an open band formed of a strip of thin metal having opposite ends overlapped, the overlapped end portion having a pair of lugs at its extremity and the overlapping end portion having a longitudinal series of teeth stamped therefrom, an actuating lever formed of sheet metal stamped to provide a segmental portion and an arm extending from said segmental portion, said actuating lever having a pair of lugs at opposite sides of said segmental portion adapted to lie between the lugs of said open band and openings in said segmental portion engaging said teeth, a pivot pin extending through the lugs of said open band and actuating lever, and means for retaining said actuating lever in clamping position.

10. A hose clamp comprising an open band formed of a strip of thin metal having opposite ends overlapped and having a pair of lugs at one end and a series of teeth extending outwardly from its other end, an actuating lever having a pair of lugs, a segmental portion between said lugs and an arm extending from said lugs, and a pivot pin extending through both pairs of lugs, the segmental portion of said actuating lever having said pivot as its center and being provided with openings adapted to engage the teeth of said band.

11. A hose clamp comprising an open band formed of a strip of thin metal having opposite ends overlapped and having a pair of lugs at one end and a series of teeth stamped therefrom at its other end, the toothed portion of said band extending between said lugs, an actuating lever formed of sheet metal having a pair of lugs at one end, a segmental portion between said lugs provided with openings adapted to engage the teeth of said band, a second pair of lugs spaced from the first-mentioned pair thereof, a flange at each side thereof between said two pairs of lugs and a longitudinal rib stamped in said lever and extending from the segmental portion thereof outwardly, a pivot pin connecting the lugs of said open band with the first-mentioned lugs of said actuating lever, the lugs of said band having corresponding edges provided with teeth, a retainer lever pivotally connected to the second-mentioned pair of lugs of said actuating lever and being formed of sheet metal, said retainer lever having a longitudinal rib therein and being adapted to engage corresponding teeth on the lugs of said open band with its free end.

In testimony whereof I affix my signature.

KARL F. W. KEMPF.